United States Patent
Nobukiyo

(10) Patent No.: US 6,510,495 B1
(45) Date of Patent: Jan. 21, 2003

(54) DATA WRITE METHOD INTO NONVOLATILE MEMORY, INFORMATION PROCESSING DEVICE AND RECORDING MEDIUM

(75) Inventor: Takahiro Nobukiyo, Tokyo (JP)

(73) Assignee: NEC Corporation, Tokyo (JP)

( * ) Notice: Subject to any disclaimer, the term of this patent is extended or adjusted under 35 U.S.C. 154(b) by 25 days.

(21) Appl. No.: 09/715,090

(22) Filed: Nov. 20, 2000

(30) Foreign Application Priority Data

Nov. 19, 1999 (JP) .......................................... 11-329469

(51) Int. Cl.[7] .............................................. G06F 12/08
(52) U.S. Cl. ....................................... 711/143; 711/103
(58) Field of Search ........................... 707/1, 200, 204, 707/203; 711/103, 118, 135, 143

(56) References Cited

U.S. PATENT DOCUMENTS

| | | | | | |
|---|---|---|---|---|---|
| 5,555,391 A | * | 9/1996 | De Subijana et al. | ....... | 711/113 |
| 5,696,929 A | * | 12/1997 | Hasbun et al. | ............... | 711/103 |
| 5,805,809 A | * | 9/1998 | Singh et al. | ................. | 709/203 |
| 5,835,942 A | * | 11/1998 | Putzolu | ...................... | 711/113 |
| 6,000,006 A | * | 12/1999 | Bruce et al. | ................. | 711/103 |
| 6,272,587 B1 | * | 8/2001 | Irons | .......................... | 711/103 |
| 6,301,635 B2 | * | 10/2001 | Bothwell et al. | ............ | 711/103 |

* cited by examiner

Primary Examiner—Gary J Portka
(74) Attorney, Agent, or Firm—Young & Thompson

(57) ABSTRACT

A method for writing data into a nonvolatile memory that allows data deletion in block units includes the steps of storing the identification information of a block to which data stored in a cache memory belongs, and, when writing data into the nonvolatile memory, determining whether the data stored in the cache memory is to be transferred to a corresponding area in the nonvolatile memory, based on a comparison of the identification information for a block to which the data being written belongs and the stored identification information, the transfer being triggered by the result of the comparison.

5 Claims, 12 Drawing Sheets

| BLOCK NUMBER | ADDRESS RANGE | BLOCK SIZE |
|---|---|---|
| 0 | 0x000000-0x001FFF | 8KB |
| 1 | 0x002000-0x003FFF | 8KB |
| 2 | 0x004000-0x005FFF | 8KB |
| 3 | 0x006000-0x007FFF | 8KB |
| : | : | : |

FIG.3

| BLOCK NUMBER | AREA NAME |
|---|---|
| 0 | FILE MANAGEMENT AREA |
| 1 | |
| 2 | FILE DATA AREA |
| 3 | |
| 4 | |
| : | |

FIG.4

START
↓
DETERMINE THE TYPE OF FILE ACCESS SUCH AS FILE OPEN, FILE WRITE AND FILE DELETE INSTRUCTIONS — S1
↓
ISSUE WRITE/READ INSTRUCTION TO NONVOLATILE MEMORY TOWARD THE ACCESSING MEANS WHILE ADDING CONTROL INFORMATION TO THE FILE ACCESS — S2
↓
END

| BLOCK NUMBER | PAGE NUMBER | SECTOR NUMBER | PAGE SIZE | BLOCK SIZE |
|---|---|---|---|---|
| 0 | 0 | 0 | 512Byte | 8KB |
| | 1 | 1 | 512Byte | |
| | 2 | 2 | 512Byte | |
| | 3 | 3 | 512Byte | |
| | 4 | 4 | 512Byte | |
| | 5 | 5 | 512Byte | |
| | 6 | 6 | 512Byte | |
| | 7 | 7 | 512Byte | |
| | 8 | 8 | 512Byte | |
| | 9 | 9 | 512Byte | |
| | 10 | 10 | 512Byte | |
| | 11 | 11 | 512Byte | |
| | 12 | 12 | 512Byte | |
| | 13 | 13 | 512Byte | |
| | 14 | 14 | 512Byte | |
| | 15 | 15 | 512Byte | |
| 1 | 0 | 16 | 512Byte | 8KB |
| | ⋮ | ⋮ | ⋮ | |
| | 15 | 31 | 512Byte | |
| 2 | 0 | 32 | 512Byte | 8KB |
| | ⋮ | ⋮ | ⋮ | |
| ⋮ | ⋮ | ⋮ | ⋮ | ⋮ |

30 FILE MANAGEMENT TABLE

| FILE NAME | OPEN/CLOSE STATUS | WRITE/READ STATUS |
|---|---|---|
| A | OPENED | WRITTEN |
| B | CLOSED | READ |
| C | CLOSED | READ |

DATA WRITE METHOD INTO NONVOLATILE MEMORY, INFORMATION PROCESSING DEVICE AND RECORDING MEDIUM

FIELD OF THE INVENTION

This invention relates to a data write method into a nonvolatile memory capable of deleting data in units of block, an information processing device to achieve the data write method, and a recording medium storing a data write control program to execute the data write method.

BACKGROUND OF THE INVENTION

In general, a nonvolatile memory such as a flash memory allows the data write/read to be conducted in word units, but requires that the data deleted in units of multiple words, i.e., in block units. Therefore, in rewriting data at an address, a block of data corresponding to the address subjected to the rewriting is once copied into a cache memory that can be accessed faster than the nonvolatile memory. Then, after renewing the stored content of the cache memory by data to be rewritten, the block data corresponding to the address subjected to the rewriting is deleted from the nonvolatile memory. Then, the data stored in the cache memory is written in block units into the corresponding area in the nonvolatile memory. Thus, the rewriting requires complicated processing.

This complicated process causes frequent access to the nonvolatile memory. Therefore, various methods have been suggested to improve the efficiency of data writing using cache memory.

For example, Japanese patent application laid-open No. 5-28039 (1993) discloses such a kind of storing device. This storing device offers a data write processing, described below, using a cache memory. When a write instruction is issued, a block data corresponding to an address subjected to the writing is read from the nonvolatile memory. The block data read is renewed (replaced) by data designated in the write instruction and is once stored into the cache memory. Then, the block data, read previously, in the nonvolatile memory is deleted. Then, the write processing of the data being stored in the cache memory into the corresponding area in the nonvolatile memory is conducted at a given timing. This given timing is defined as a case of having no access request to that block during a given time, a case of being close to lacking in the capacity of cache memory, a case of detecting the turn off of the power supply of device etc.

Thus, in the above prior art, the timing of writing the data being stored in the cache memory into the nonvolatile memory is normally defined as the case of having no access request to that block during a given time. This means that the data being stored in the cache memory is written into the nonvolatile memory by using the elapsed time as a trigger. Accordingly, there is a problem that there occurs the processing overhead from after issuing the write instruction until writing the data being stored in the cache memory into the nonvolatile memory.

Furthermore, in the above prior art, given that the capacity of cache memory corresponds to, e.g., the amount of one block, the data stored in the cache memory needs to be stored into the corresponding area in the nonvolatile memory every time the write instruction is issued. Therefore, since the number of access to the nonvolatile memory increases, the processing overhead occurs as well.

SUMMARY OF THE INVENTION

Accordingly, it is an object of the invention to provide a method for writing a data into a nonvolatile memory that the number of access to the nonvolatile memory reduces, thereby the processing overhead can be reduced.

It is a further object of the invention to provide an information processing device that offers a write control operation to reduce the number of access to a nonvolatile memory, so that the processing overhead can be reduced.

It is a still further object of the invention to provide a recording medium that offers a write control program to reduce the number of access to a nonvolatile memory, so that the processing overhead can be reduced.

According to the invention, a method for writing a data into a nonvolatile memory that allows data deletion in units of block, comprises the steps of:

storing the identification information of a block to which a data being stored in a cache memory having an access speed faster than the nonvolatile memory belongs; and when writing a write data into the nonvolatile memory, determining whether the data being stored in the cache memory is stored into a corresponding area in the nonvolatile memory or not, based on the identification information of a block to which the write data belongs and the identification information stored previously.

According to another aspect of the invention, a method for writing a data into a nonvolatile memory that allows data deletion in units of block, comprises the step of:

when a file close instruction to terminate the file access to a file that exists in the nonvolatile memory is issued, the file being currently in written and opened status, and when there is no file being opened except the file subjected to the file close by the file close instruction, controlling a data being stored in a cache memory having an access speed faster than the nonvolatile memory to be stored into a corresponding area in the nonvolatile memory.

According to another aspect of the invention, an information processing device capable of issuing a data write instruction, comprises:

a nonvolatile memory capable of deleting a data in units of block;

a cache memory having an access speed faster than the nonvolatile memory;

an identification information storing means that stores the identification information of a block to which a data being stored in the cache memory belongs; and a write control means that controls the write operation of a data;

wherein the write control means calculates the identification information of a block to which a data subjected to a data write instruction belongs when the data write instruction is issued, and determines whether the data being stored in the cache memory is stored into a corresponding area in the nonvolatile memory or not, based on the calculated identification information and the identification information stored in the identification information storing means.

According to another aspect of the invention, a recording medium readable by a computer for storing a data write control program to execute a data write into a nonvolatile memory capable of deleting a data in units of block, the data write control program comprises the processing steps of:

storing the identification information of a block to which a data being stored in a cache memory having an access speed faster than the nonvolatile memory belongs; and when writing a write data into the nonvolatile memory, determining whether the data being stored in the cache memory is stored into a corresponding area in the nonvolatile memory or not, based on the identification information of a block to which the write data belongs and the identification information stored previously.

BRIEF DESCRIPTION OF THE DRAWINGS

The invention will be explained in more detail in conjunction with the appended drawings, wherein:

FIG. 3 is a table showing FAT composition;

FIG. 4 is a flow chart showing the operation of an information processing means 10 in FIG. 1;

DESCRIPTION OF THE PREFERRED EMBODIMENTS

Figures 1, 2:
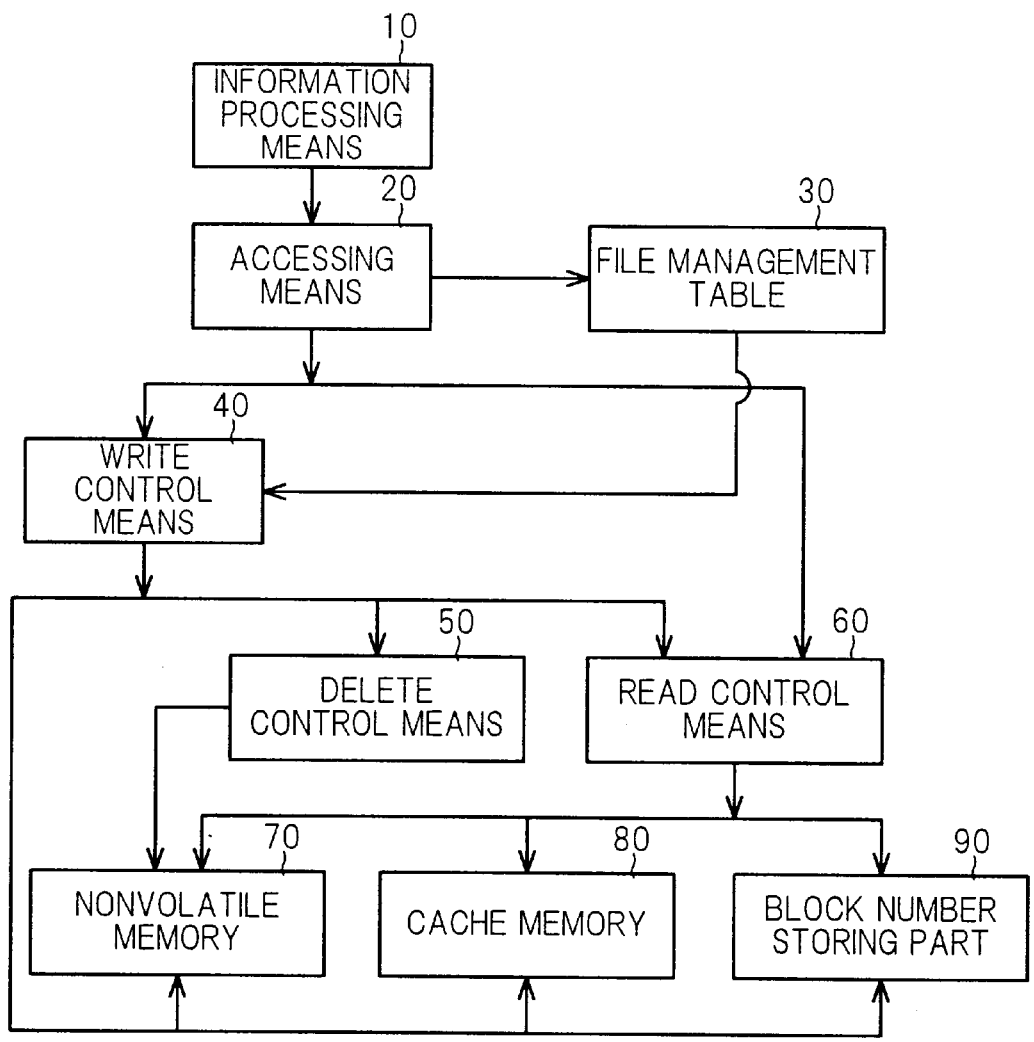
FIG. 1 is a block diagram showing an information processing device in a preferred embodiment according to the invention.
FIG. 2 is a table showing the memory construction of a nonvolatile memory 70 in FIG. 1 used in the first operation example.

The referred embodiments of the invention will be explained below, referring to the drawings.

FIG. 1 is a block diagram showing an information processing device in the preferred embodiment according to the invention. As shown in FIG. 1, the information processing device is composed of an information processing means 10, an accessing means 20, a file management table 30, a write control means 40, a delete control means 50, a read control means 60, a nonvolatile memory 70, a cache memory 80 and a block number storing part 90. Meanwhile, arrows in the drawings herein indicate that part pointed by the arrows is subjected to the controlling or referring.

The composition and operation of the respective components of this device are explained below.

The information processing means 10 determines which file access command to select from various file access commands, such as "file open instruction" that is an instruction to start access to a file, "file close instruction" that is an instruction to finish access to a file, "file delete instruction" that is an instruction to delete a file, "file name change instruction" that is an instruction to change the name of a file, "file write instruction" that is an instruction to write data into a file, and "file read instruction" that is an instruction to read data from a file. Information processing means 10 also adds control information for executing the determined file access command, and issues a data write/read instruction for executing the file access to the accessing means 20.

The accessing means 20 has a function for judging which of the read and write instructions is issued from the information processing means 10 and executing a processing according to the judged result, and has a function for renewing the file management table 30 based on type of the file access. The processing according to the judged result includes a processing of referring to the type of the file access and the stored content of the file management table 30 and setting to validate or invalidate "file close write condition" and "file close extra-write condition", and a processing of issuing a write instruction and a read instruction to the write control means 40 and the read control means 60, respectively.

Figures 16, 17:
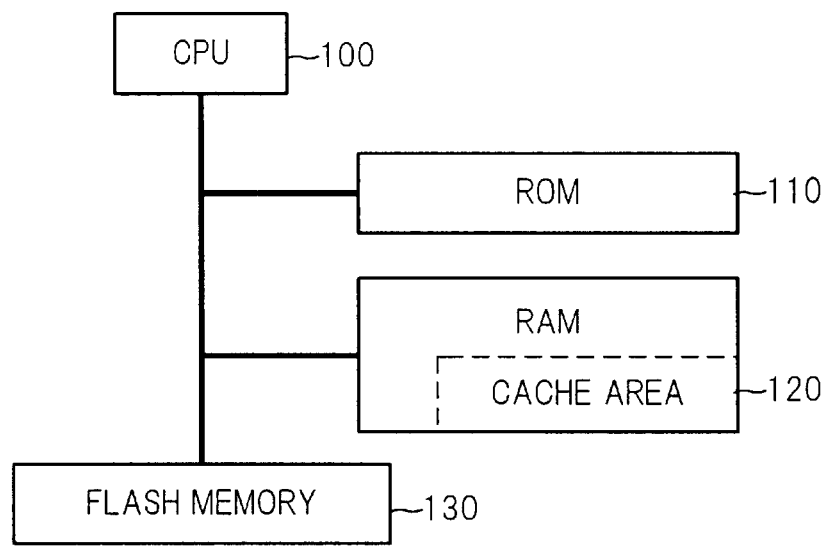
FIG. 16 is a schematic diagram showing the hardware composition of an information processing device in a preferred embodiment according to the invention.
FIG. 17 is a table showing a file management table 30 in FIG. 1.

As shown in FIG. 17, the file management table 30 stores management information such as information of the name of files existing in the nonvolatile memory 70, information to indicate whether the file is in opened status or in closed status and information to indicate whether the file is in written status or in read status. The information is renewed properly by the accessing means 20. FIG. 17 shows an example that there exist three files with names A, B and C. In this example, which indicates management information being stored in the file management table 30, the file A is currently in written status and in opened status, and both of the files B and C are currently in read status and in closed status.

The write control means 40 has a function for judging whether "file close write condition" and "file close extra-write condition", respectively, are valid or invalid, and executing a processing according to the judged result. The processing according to the judged result includes a processing of writing, in units of block, data into the area in the nonvolatile memory 70 corresponding to block number calculated based on an address designated in the write instruction, a processing of issuing a delete instruction to the delete control means 50 to conduct the delete control, a processing of issuing a read instruction to the read control means 60 to conduct the read control, a processing of renewing data in the cache memory 80, and a processing of renewing block number stored in the block number storing part 90 by block number to which data stored in the cache memory 80 belongs.

The delete control means 50 has a function for deleting, in units of block, data in the nonvolatile memory 70 corresponding to block number designated in the delete instruction.

The read control means 60 has a function for referring to the stored content of the block number storing part 90, thereby judging whether data of an address designated in the read instruction is stored in the cache memory 80 or not. If stored, the data is read from the cache memory 80. If not stored, the data is read from the nonvolatile memory 70.

The nonvolatile memory 70 is a flash memory etc., and is able to delete data in units of block (in units of multiple words) and able to read/write data in units of word (in units of multiple bits). The nonvolatile memory 70 can store multiple files together with file management information.

The cache memory 80 is a memory faster in access speed than the nonvolatile memory 70, and temporarily stores data to be written into the nonvolatile memory 70.

The block number storing part 90 stores block number to which data stored in the cache memory 80 belongs.

First Example of Operation

The first example of operation of the device is explained below. Meanwhile, in the embodiments of this invention, it is assumed that the file management is conducted in FAT (file allocation tables) format. As shown in FIG. 3, in the FAT format, memory area is divided into file management area and file data area. The file management area is an area to store management information such as file name, file size, file renewal date, file data contents etc. The file data area is an area to store file data contents.

Referring to FIGS. 4 to 8, the operation of the respective components in FIG. 1 is explained in detail below. Meanwhile, in the first example of operation, it is assumed that the capacity of the cache memory 80 is one block, i.e. 8 KB and the nonvolatile memory 70 has a memory composition shown in FIG. 2. As shown in FIG. 2, the nonvolatile memory 70 is of blocks, each block being 8 KB and each block number being sequentially set from zero. Also, "0x" in the address range of each block means a numeral in hexadecimal. In the nonvolatile memory 70, writing/reading can be conducted in units of one byte, and deleting is conducted in units of one block, i.e. 8 KB. In the writing/reading, the address can be designated as, e.g., 8 bytes from address "0x0040F0". In the deleting, one arbitrary address in the address range corresponding to a block subjected to the deleting can be designated. For example, in order to delete a block of block number 3, needed is only to designate one arbitrary address, e.g. "0x006000", in the address range "0x006000 to 0x007FFF" of block number 3.

First, the operation of the information processing means 10 is explained in FIG. 4. The information processing means 10 determines the type of file access, such as file open instruction, file write instruction, file read instruction, file close instruction, file name change instruction and file delete instruction (step S1). Here, the file open instruction, file delete instruction and file name change instruction need to issue a write instruction so as to rewrite management information stored in the file management area. Also, the file write instruction needs to issue a write instruction so as to rewrite data stored in the file data area. In the file close instruction, if there is no file being written, a write instruction is issued to write data stored in the cache memory 80 into the corresponding area in the nonvolatile memory 70. Thus, the information processing means 10 issues a write/read instruction to the accessing means 20 so as to execute the determined type of file access while adding control information (e.g., information to designate the area subjected to rewriting) for executing the file access (step S2).

Figure 5:
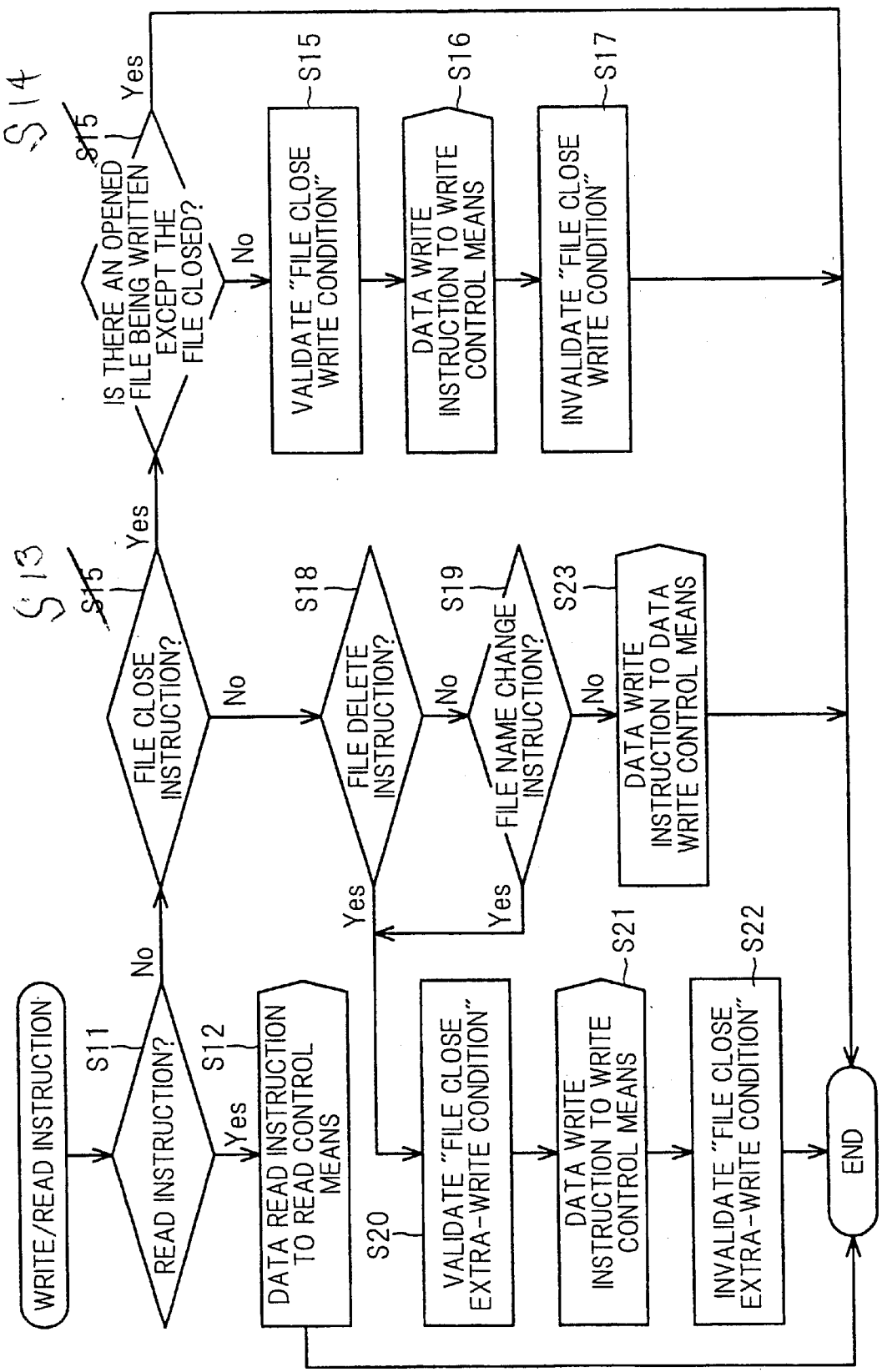
FIG. 5 is a flow chart showing the first operation example of an accessing means 20 in FIG. 1.

Referring to FIG. 5, the processing operation of the accessing means 20 is explained below.

When the accessing means 20 receives the write/read instruction issued from the information processing means 10, it judges whether the instruction received is data read instruction or not (step S11). If it is a data read instruction (step S11: Yes), the address and data subjected to the reading are designated and the data read instruction is issued to the read control means 60 (step S12). If it is not a data read instruction (step S11: No), then it is judged whether the type of file access is a file close instruction (step S13). If it is a file close instruction (step S13: Yes), it is judged, with reference to the stored content of the file management table 30, whether, except the file to be closed by this file close instruction, an open file being written exists (step S14). If it does not exist (step S14: No), "file close write condition" is validated (step S15), a data write instruction is issued to the write control means 40 (step S16), and after the write processing by the write control means 40 is finished the "file close write condition" is invalidated (step S17). On the other hand, if it exists (step S14: Yes), the processing by the accessing means 20 is finished. Thus, through steps S13 and S14, the file close instruction to an open file existing in the nonvolatile memory 70 is issued, and, when it is judged that no open file except the file subjected to closing by the file close instruction exists, the data stored in the cache memory 80 is stored into the corresponding area in the nonvolatile memory 70. Therefore, the processing overhead, which occurs in prior art, until when a given time elapses does not occur. In a status that the stored content of the file management table 30 is as shown in FIG. 17, when the file close instruction is issued to file name A, data from the cache memory 80 is stored into the corresponding area in the nonvolatile memory 70.

If the type of file access is not a file close instruction (step S13: No), then it is judged whether the type of file access is a file delete instruction or a file name change instruction (steps S18, S19). If it is a file delete instruction or a file name change instruction (steps S18, S19: Yes), "file close extra-write condition" is validated (step S20), a write instruction is issued to the write control means 40 designating the data and address subjected to the writing (step S21), after the writing by the write control means 40, "file close extra-write condition" is invalidated (step S22). If it is not a file delete instruction or a file name change instruction (steps S18, S19: No), a write instruction is issued to the write control means 40 designating the data and address subjected to the writing (step S23). In general, the file delete instruction and file name change instruction can be executed regardless of whether the execution of file open instruction exists, and therefore with these instructions only the file management area is rewritten. Namely, the information processing means 10 does not always conduct the file close instruction. Therefore, if the write condition is not provided, data whose writing into the nonvolatile memory 70 is not executed may be left in the cache memory 80. So, the validating and invalidating of file close extra-write condition are conducted. Although not shown in FIG. 5, the accessing means 20 properly renews the stored content of the file management table 30 based on the instruction issued from the information processing means 10.

Figure 6:
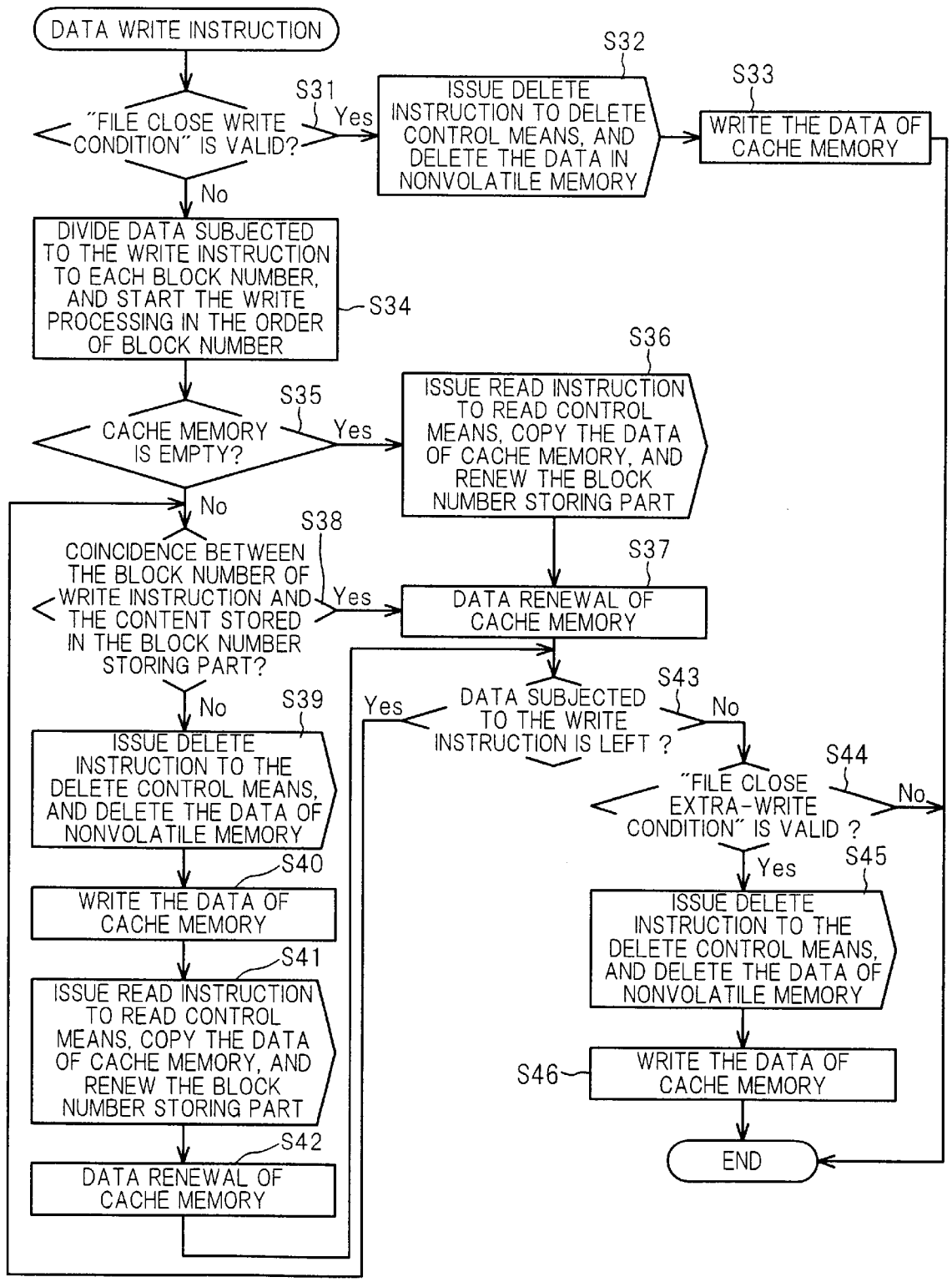
FIG. 6 is a flow chart showing the first operation example of write control means 40 in FIG. 1.

Referring to FIG. 6, the processing operation of the write control means 40 is explained below.

This processing operation is conducted corresponding to steps S16, S21 and S23 in FIG. 5. Receiving a data write instruction, the write control means 40 judges whether "file close write condition" is valid or not (step S31). If valid (step S31: Yes), a delete instruction is issued to the delete control means 50, thereby data in area of nonvolatile memory 70 corresponding to the block number stored in the block number storing part 90 is deleted (step S32). Then, into this area deleted, data stored in the cache memory 80 is written in units of block (step S33).

On the other hand, if "file close write condition" is invalid (step S31: No), the data subjected to the write instruction is divided to each block number, and the write processing starts in the order of block number (step S34). Then, it is judged whether the cache memory 80 is empty or not (step S35). If the cache memory 80 is empty due to the data read from the nonvolatile memory 70 being not stored (step S35: Yes), a read instruction is issued to the read control means 60, thereby data in the nonvolatile memory 70 corresponding to the block number calculated from the address subjected the write instruction is read in units of block and copied into the cache memory 80, thereby the stored content of the block number storing part 90 is renewed by the block number of block thus read (step S36). Meanwhile, the emptiness of cache memory 80 means a case that no write instruction is issued up to then like the initial state. Then, of data stored in the cache memory 80, the data corresponding to the address subjected to the write instruction is rewritten by the data subjected to the write instruction (step S37). Then it goes to the next processing, step S43.

On the other hand, if the cache memory 80 is not empty (step S35: No), it is judged whether the block number calculated from the address subjected to the write instruction coincides with block number stored in the block number storing part 90 (step S38). If coincides with it (step S38: Yes), since data in the nonvolatile memory 70 corresponding to the address subjected to the write instruction is copied in the cache memory 80, the processing of step S37 is executed. Also, if does not coincide with it (step S38: No), the delete control means 50 is controlled to delete data in the nonvolatile memory 70 corresponding to the block number stored in the block number storing part 90 (step S39). Then, data stored in the cache memory 80 is written in units of block into the area in the nonvolatile memory 70 corresponding to the block number stored in the block number storing part 90 (step S40). Then, a read instruction is issued to the read control means 60, thereby data in the nonvolatile memory 70 corresponding to the block number calculated from the address subjected to the write instruction is read in units of block and copied into the cache memory 80, thereby the data in the block number storing part 90 is renewed by the block number thus read S41). Then, of data stored in the cache memory 80, the data corresponding to the address subjected to the write instruction is rewritten by the data subjected to the write instruction (step S42). Then it goes to the next processing, step S43.

At step S43, it is judged whether data subjected to the write instruction is still left or not. If data subjected to the write instruction is still left (step S43: Yes), returning to step S38, like processing is conducted. For example, when a write instruction of three blocks, block numbers 4 to 6, is received from the accessing means 20, it returns at least twice from step S43 to step S38.

On the other hand, if data subjected to the write instruction is not left (step S43: No), it is judged whether "file close extra-write condition" is valid or not (step S44). If valid (step S44: Yes), the delete control means 50 is controlled to delete data in the nonvolatile memory 70 corresponding to the block number stored in the block number storing part 90 (step S45). Then, data stored in the cache memory 80 is written in units of block into the area in the nonvolatile memory 70 corresponding to the block number stored in the block number storing part 90 (step S46). Also, if not valid (step S44: No), the processing by the write control means 40 is finished.

Figure 7:
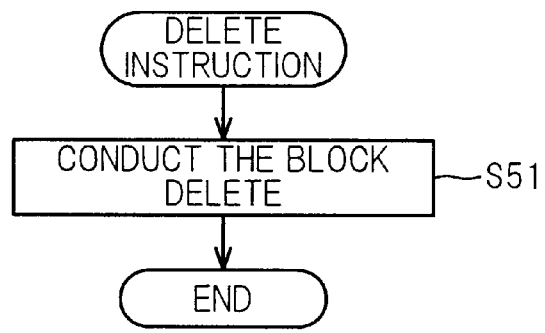
FIG. 7 is a flow chart showing the operation of a delete control means 50 in FIG. 1.

Referring to FIG. 7, the processing operation of the delete control means 50 is explained below.

This processing operation is conducted corresponding to steps S32, S39 and S45 in FIG. 6. Receiving a delete instruction, the delete control means 50 deletes data in the nonvolatile memory 70 corresponding to the block number designated (step S51).

Figure 8:
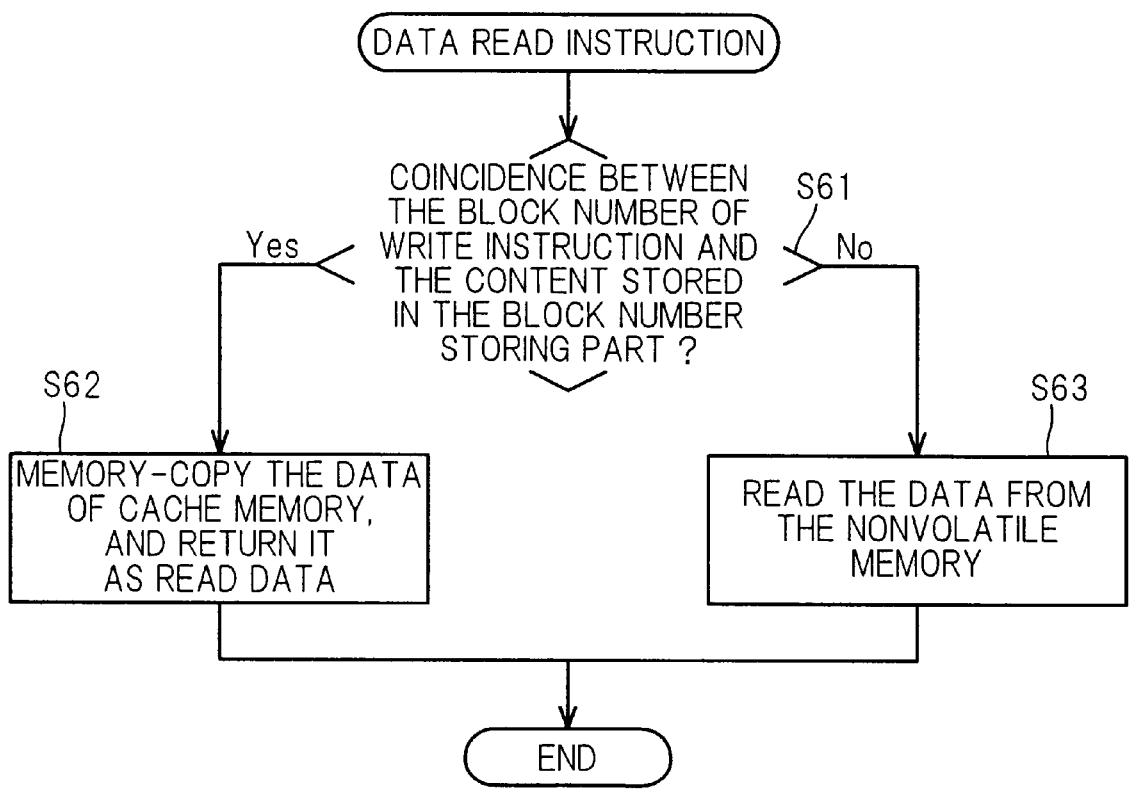
FIG. 8 is a flow chart showing the operation of a read control means 60 in FIG. 1.

Referring to FIG. 8, the processing operation of the read control means 60 is explained below.

This processing operation is conducted corresponding to steps S36 and S41 in FIG. 6. Receiving a data read instruction, the read control means 60 judges whether the block number calculated from the address subjected to the read instruction coincides with block number stored in the block number storing part 90 (step S61). If coincides with it (step S61: Yes), since data subjected to the read instruction is stored in the cache memory 80, the data stored in the cache memory 80 is memory-copied, then output as the read data (step S62). In this case, since the data can be read out from the cache memory 80 faster in access speed than the nonvolatile memory 70, the faster read processing can be executed. Also, if does not coincide with it (step S61: No), the data is read from the designated address in the nonvolatile memory 70, and then it is output (step S63). In this case, the data rewriting of the cache memory 80 is not conducted.

As explained thus far, in this embodiment, when a data write instruction is issued, the write control means 40 calculates the block number to which data subjected to the write instruction belongs. Then, based on the calculated block number and block number stored in the block number storing part 90, it is determined whether the data stored in the cache memory 80 is stored into the corresponding area in the nonvolatile memory 70. Therefore, different from prior art, the data being stored in the cache memory is not written into the nonvolatile memory by using the elapsed time as a trigger. As a result, the processing overhead can be reduced.

Also, if the calculated block number is different from the block number stored in the block number storing part 90, the write control means 40 controls the data being stored in the cache memory 80 to be stored into the corresponding area in the nonvolatile memory 70. In other case, the stored content of the cache memory 80 is renewed with the data subjected to the writing, and the stored content of the block number storing part 90 is renewed with the calculated block number. Thus, only when the block numbers are different from each other, the data stored in the cache memory 80 is stored into the corresponding area in the nonvolatile memory 70. Therefore, the number of access to the nonvolatile memory 70 can be reduced. Also, when the block numbers coincide, the stored content of the cache memory 80 is renewed with the write data. Therefore, also in this case, the number of access to the nonvolatile memory 70 can be reduced. As a result, the processing overhead can be reduced.

Also, the write control means 40 further refers the management information stored in the file management table 30. When a file close instruction is issued and it is judged that no file being opened except the file being subjected to the closing by the file close instruction exists, the data being stored in the cache memory 80 is stored into the corresponding area in the nonvolatile memory 70. Therefore, different from prior art, the data being stored in the cache memory is not written into the nonvolatile memory by using the elapsed time as a trigger. As a result, the processing overhead can be reduced.

For easier understanding of the invention, the detailed example of operation is explained below.

Figure 9A:
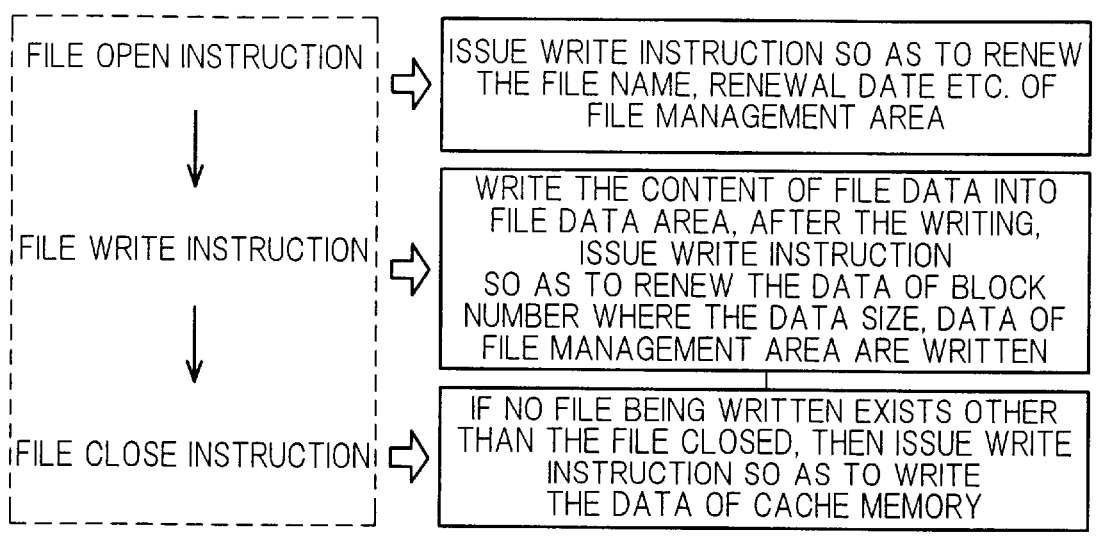
FIGS. 9A and 9B are explanatory diagrams showing the operation of the information processing means 10 in FIG. 1.
Figure 9B:
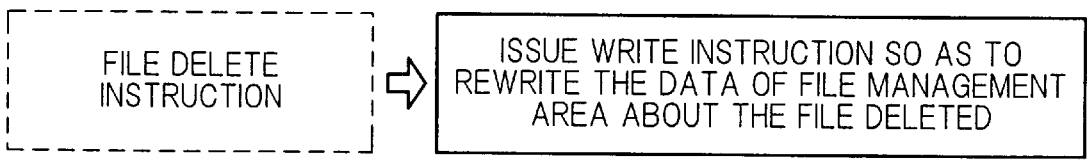

FIGS. 9A and 9B are explanatory diagrams showing the example of operation of the information processing means 10. In FIG. 9, show is a case that the information processing means 10 determines the type of file access and instructs the accessing means 20 about the write/read processing. As shown in FIG. 9A, in making a new file, it is necessary to execute "file open instruction", "file write instruction" and "file close instruction" sequentially. In this case, in order to lead the respective file access instructions into execution, a data write/read instruction is issued to the accessing means 20 adding control information for executing such operations as described at the right in FIG. 9A (steps S1, S2 in FIG. 3). Similarly, in order to lead the file delete instruction into execution, a data write/read instruction is issued to the accessing means 20 adding control information for executing such an operation as described at the right in FIG. 9B (steps S1, S2 in FIG. 3).

Figure 10:
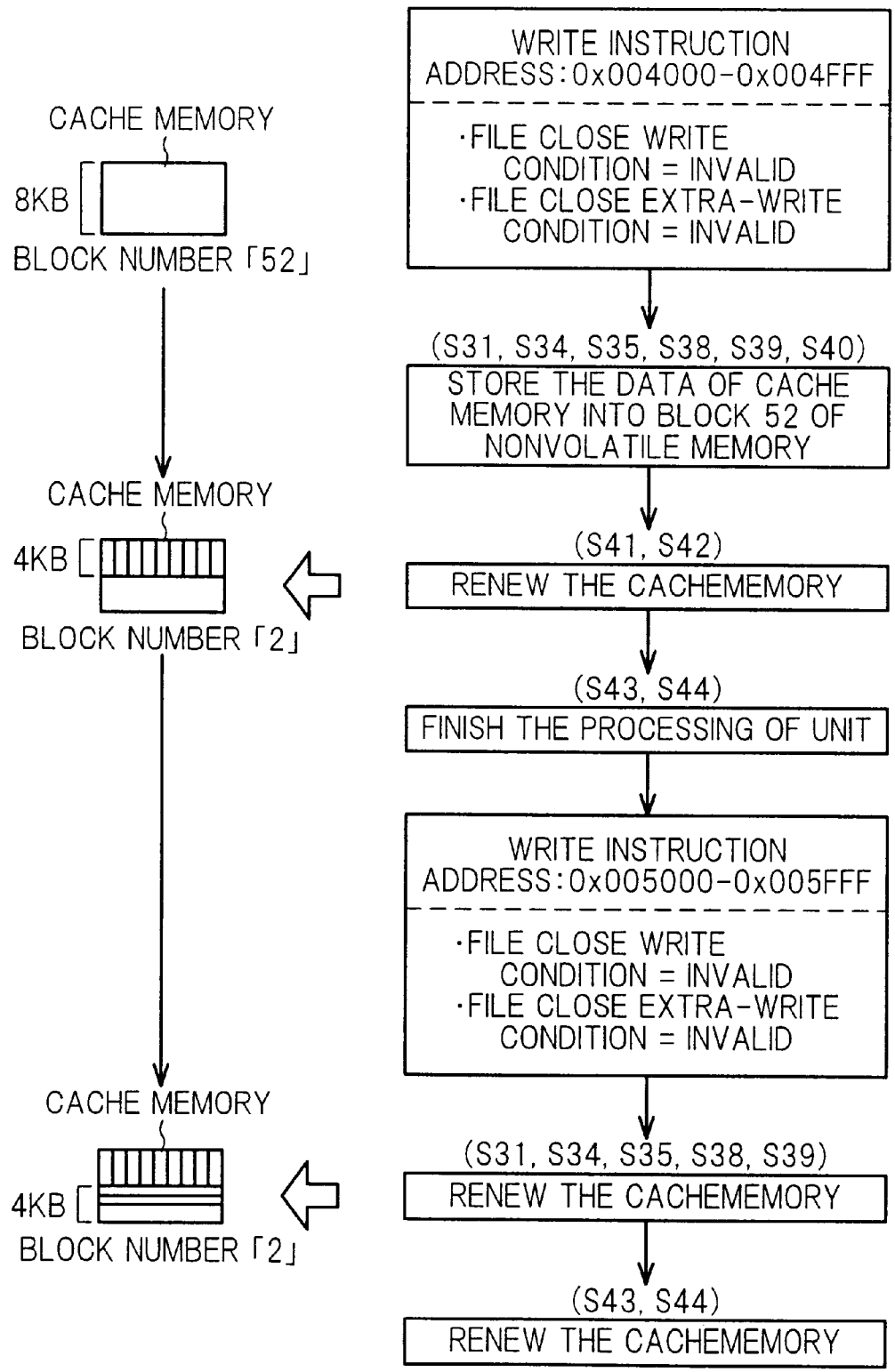
FIG. 10 is a schematic diagram showing the first operation example.

FIG. 10 is an explanatory diagram showing the example of operation of the write control means 40. Now, it is assumed that, in a status that neither "file close write condition" nor "file close extra-write condition" is valid and the cache memory 80 are storing data to be written into block 52, the write control means 40 receives a write instruction to a file data area (0x004000 to 0x004FFF). First, from the address (0x004000 to 0x004FFF) of data subjected to the write instruction, block number 2 is calculated. The stored content of the block number storing part 90 is "52". Thus, since the block number 2 calculated from the address subjected to the write instruction does not coincide with the stored content "52" in the block number storing part 90, the data being stored in the cache memory 80 is written into the corresponding area to block number 52 in the nonvolatile memory 70 (steps S31, S34, S35, S38, S39 and S40 in FIG. 6). Then, a read instruction is issued to the read control means 60, thereby the corresponding data to block number 2 in the nonvolatile memory 70 is read and copied into the cache memory 80, thereby, of data stored in the cache memory 80, the corresponding 4 KB data to the address (0x004000 to 0x004FFF) is renewed (steps S41, S42 in FIG. 6). Then, the processing operation of the write control means 40 is finished (steps S43, S44 in FIG. 6). Part of vertical lines in FIG. 10 indicates the part being subjected to data renewal.

Further, it is assumed that, in a status that neither "file close write condition" nor "file close extra-write condition" is, as is, valid, the write control means 40 receives a write instruction to a file data area (0x005000 to 0x005FFF). First, from the address (0x005000 to 0x005FFF) of data subjected to the write instruction, block number 4 is calculated. The stored content of the block number storing part 90 is "4". Thus, since the block number 4 calculated from the address subjected to the write instruction does coincide with the stored content "4" in the block number storing part 90, of data stored in the cache memory 80, the corresponding 4 KB data to the address (0x005000 to 0x005FFF) is renewed (steps S31, S34, S35, S38 and S37 in FIG. 6). Then, the processing operation of the write control means 40 is finished (steps S43, 44 in FIG. 6). For this processing, part of horizontal lines in FIG. 10 indicates the part being subjected to data renewal.

As explained above, in writing data into the nonvolatile memory 70, based on the block number to which the write data belongs and the block number to which data being stored in the cache memory 80 belongs, it is determined whether the data being stored in the cache memory 80 is to be stored into the corresponding area in the nonvolatile memory 70. Therefore, since, different from prior art, the elapsed time is not used as a trigger, the processing overhead can be reduced by thus much. In detail, when the block number to which the write data belongs is different from the block number stored in the block number storing part 90, i.e., when the block numbers do not coincide with each other, the data being stored in the cache memory 80 is stored into the corresponding area in the nonvolatile memory 70. Therefore, the number of access to the nonvolatile memory 70 reduces and as a result the processing overhead can be reduced. Also, when the block numbers are identical with each other, the stored content of the cache memory 80 is renewed with the write data. Therefore, the number of access to the nonvolatile memory 70 reduces and as a result the processing overhead can be reduced.

Second Example of Operation

Figures 11, 12:
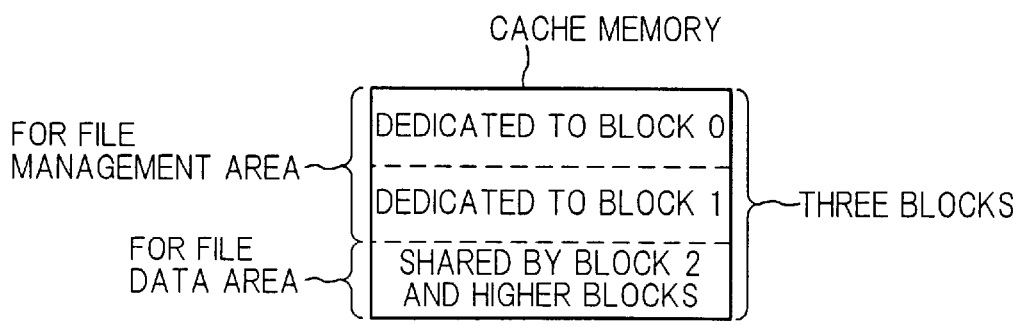
FIG. 11 is a table showing the memory construction of the nonvolatile memory 70 used in the second operation example.
FIG. 12 is a table showing FAT composition employed in the second operation example.

The second example of operation of the device is explained below. In this operation example, it is assumed that the nonvolatile memory 70 having a memory construction shown in FIG. 11 is used. In the nonvolatile memory 70 in FIG. 11, one block is of 16 pages and the sector number is set in sequence. In this nonvolatile memory 70, an access area is designated by using sector number and address. For example, write/read is conducted designating sector 26 and 256 bytes from address "0x100". Delete is conducted designating some sector of a block subjected to the delete. For example, to delete the block of block number 2, arbitrary one sector, e.g. sector 33, of sectors 32 to 47 belonging to block number 2 is designated. Although the write/read can be conducted in units of one byte, the write/read crossing over multiple pages can not be conducted in the lump. So, in order to read data of three pages, it is necessary to repeat the read in units of page three times. The delete can be conducted in units of one block, i.e. 8 KB. In this operation example, as shown in FIG. 12, used is a FAT that two blocks for exclusive use to file management area and one block for file data area, totally three blocks are provided. In general, when a file access led to a data write such as file write instruction, file delete instruction and file name change instruction is conducted, the stored content of file management area always has to be rewritten. Therefore, the number of access per one block to the file management area is used much more than that to the file data area. Because of this, the cache memory is thus assigned considering the number of access, thereby the efficiency of data write processing can be further enhanced.

The different points in this operation example from the first operation example in FIGS. 1, 4, 5, 6, 7 and 8 are that the capacity of the cache memory 80 in FIG. 1 is 24 KB equal to three blocks, and that the accessing means 20 and write control means 40 additionally take charge of a new processing. A block number in the nonvolatile memory 70 corresponding to data for the file data area being stored in the cache memory 80 is stored into the block number storing part 90.

Figure 13:
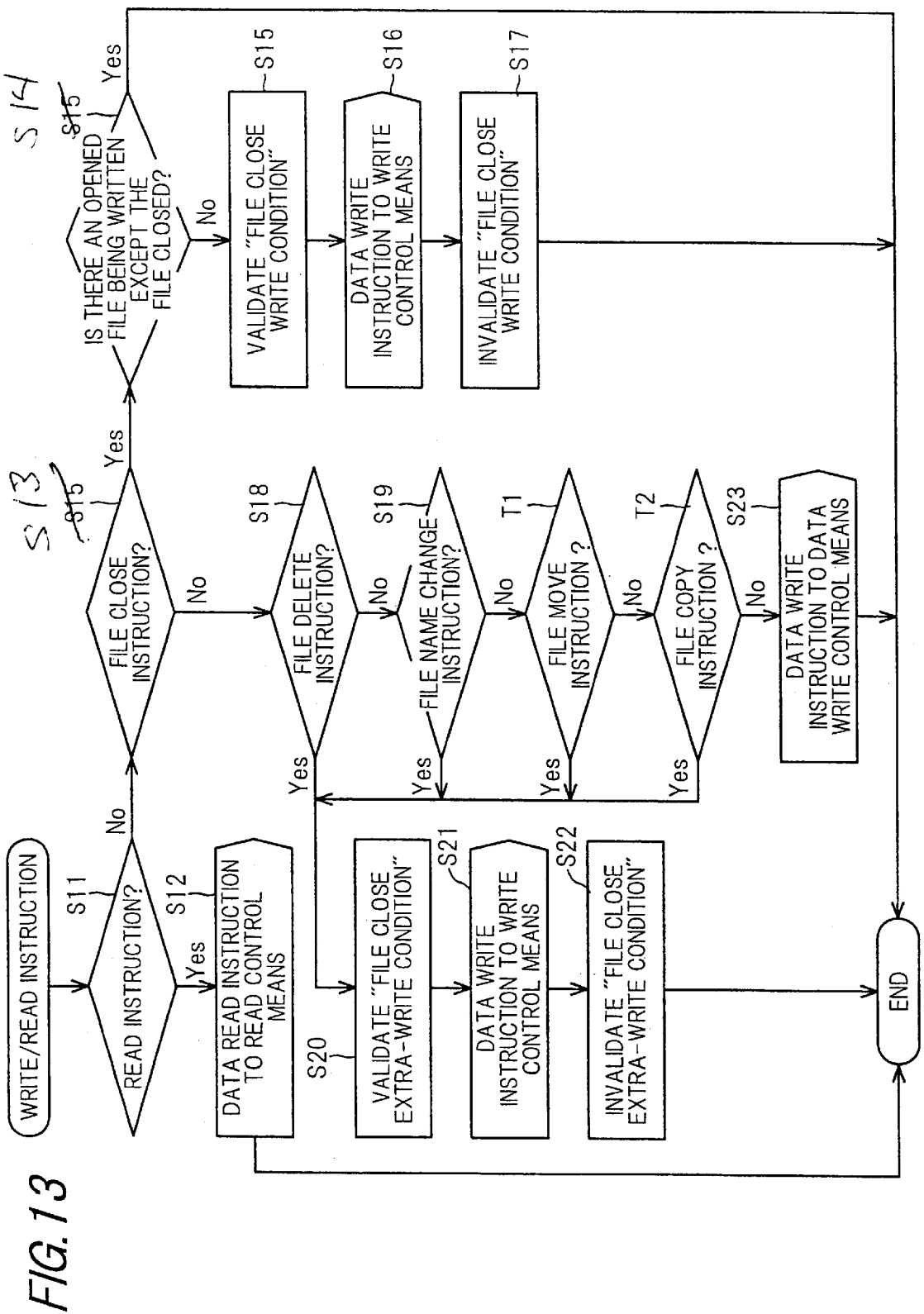
FIG. 13 is a flow chart showing the second operation example of the accessing means 20.

First, referring to FIG. 13, the processing operation of the accessing means 20 is explained. In comparison with FIG. 5, the difference is only that file move instruction (step T1) and file copy instruction (step T2) are added as a case to invalidate "file close extra-write condition", the other steps are same. The file move instruction and file copy instruction can be executed, like the file delete instruction, regardless of whether the execution of file open instruction exists, and therefore only the file management area is rewritten. Namely, the information processing means 10 does not always conduct the file close instruction. Therefore, for a data write instruction in the file access by the file move instruction and file copy instruction, "file close extra-write condition" is validated. The explanation of the detailed operation concerning FIG. 13 is omitted here.

Figure 14:
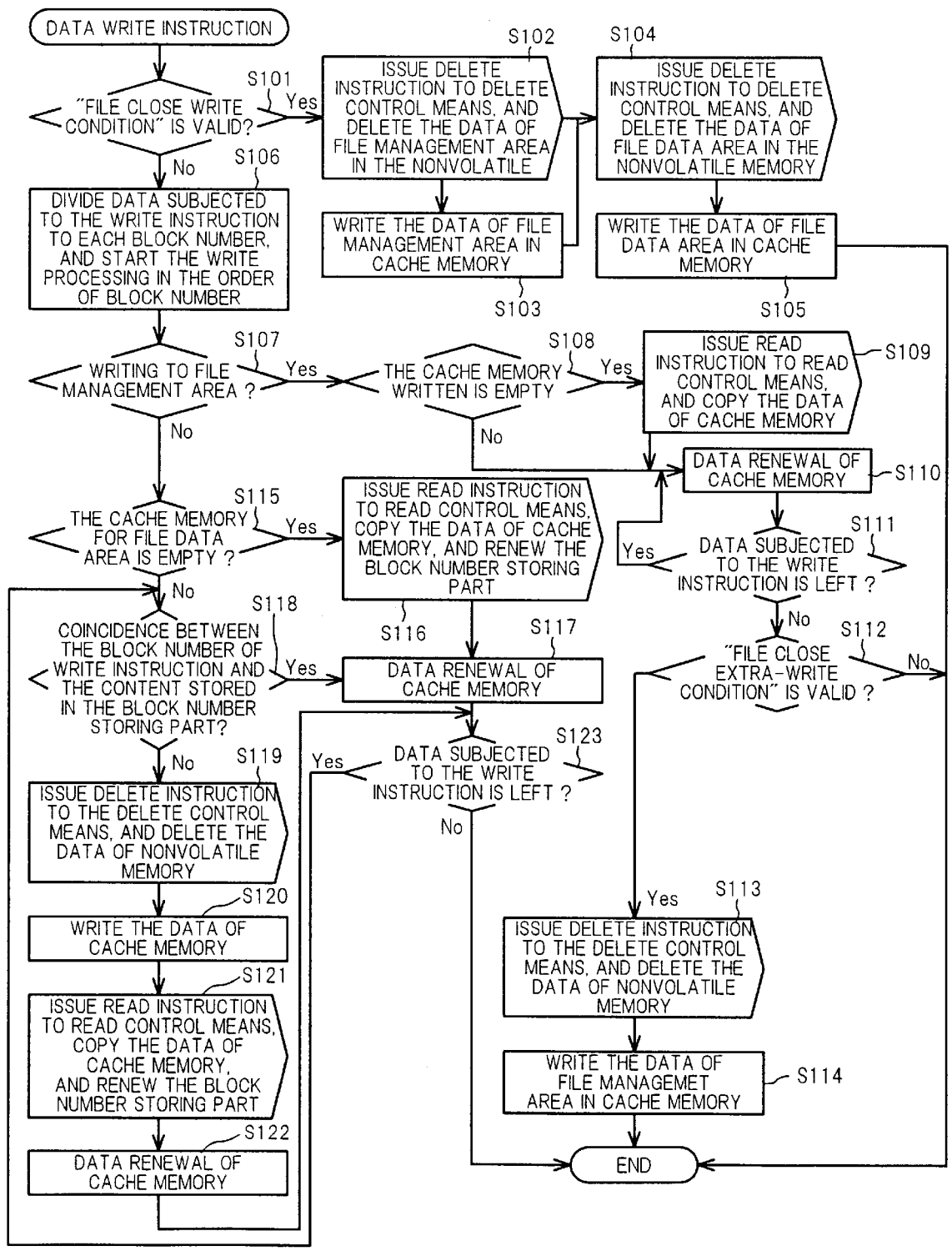
FIG. 14 is a flow chart showing the second operation example of the write control means 40.

Referring to FIG. 14, the processing operation of the write control means 40 is explained below.

This processing is conducted corresponding to steps S16, S21 and S23 in FIG. 13. Receiving a data write instruction, the write control means 40 judges whether "file close write condition" is valid or not (step S101). If valid (step S101: Yes), a delete instruction is issued to the delete control means 50, thereby two blocks, block 0 and block 1, in the file management area of nonvolatile memory 70 are deleted (step S102). Then, data of block 1 and block 2 in the file management area of the cache memory 80 are written, in units of block, into the corresponding area of the nonvolatile memory 70 (step S103). Then, a delete instruction is again issued to the delete control means 50, thereby the corresponding data in the nonvolatile memory 70 to block number stored in the block number storing part 90 is deleted (step S104). Then, data being stored in the cache memory 80 is written, in units of block, into the corresponding area in the nonvolatile memory 70 to the block number stored in the block number storing part 90 (step S105).

On the other hand, if "file close write condition" is invalid (step S101: No), the data subjected to the write instruction is divided to each block number, and the write processing starts in the order of block number (step S106). Then, it is judged whether the address subjected to the write instruction belongs to file management area or file data area (step S107). Meanwhile, it is assumed that the accessing means 20 does not issue simultaneously the data of both file management area and file data area to the write control means 40. In a case that the accessing means 20 issues a write instruction to both the area, it is necessary to issue separately the write instruction to each area. If the address subjected to the write instruction belongs to the file management area, then it is judged whether the corresponding area in the cache memory 80 to the block in the file management area subjected to the write instruction is empty or not (step S108). If the area for file management area in the cache memory 80 is empty (step S108: Yes), a read instruction is issued to the read control means 60, thereby data in the nonvolatile memory 70 corresponding to the block number calculated from the address subjected to the write instruction is read in units of block and copied into the area for file management area in the cache memory 80 (step S109), thereby of data being stored in the area for file management area in the cache memory 80, the corresponding data to the address subjected to the write instruction is rewritten (step S110). Then, it goes to the next processing, step S111.

If the area for file management area in the cache memory 80 is not empty (step S108: No), the processing of step S110 is executed and then it goes to the next processing, step S111. Once the data in the file management area is read, the data for file management area, block 1 and block 2, in the cache memory 80 is continuously stored and renewed. So, unless the reset etc. is done, it is unnecessary to read the data from the nonvolatile memory 70.

At step S111, it is judged whether data subjected to the write instruction is still left or not. If data subjected to the write instruction is still left (step S111: Yes), it returns to step S110. For example, when a write instruction to block 0 and block 1 of file management area is received, block 0 is first rewritten. Then, after finishing the renewal to block 0 of the cache memory 80, when judged whether data subjected to the write instruction is still left or not, it is known that the data of block 1 is still left. Therefore, it returns to step S110 again.

If data subjected to the write instruction is not left (step S111: No), it is judged whether "file close extra-write condition" is valid or not (step S112). If valid (step S112: Yes), issuing a delete instruction to the delete control means 50, the data in the nonvolatile memory 70 corresponding to the file management area, block 0 and block 1 is deleted (step S113). Then, data for the file management area, block 1 and block 2, in the cache memory 80 is written in units of block into the corresponding area in the nonvolatile memory 70 (step S114). Also, if not valid (step S112: No), the processing by the write control means 40 is finished.

In this operation example, the case that "file close extra-write condition" is valid means that the data write instruction by file access not to rewrite the file data area is issued. So, the data for file data area in the cache memory 80 is not written into the nonvolatile memory 70.

On the other hand, if the address subjected to the write instruction does not belong to file management area (step S107: No), then it is judged whether the area for file data area in the cache memory 80 is empty or not (step S115). If the area for file data area in cache memory 80 is empty due to the data read from the cache memory 80 being not stored (step S115: Yes), a read instruction is issued to the read control means 60, thereby data in the nonvolatile memory 70 corresponding to the block number calculated from the address subjected to the write instruction is read in units of block and copied into the area for file data area in the cache memory 80, thereby the stored content of the block number storing part 90 is renewed by the block number of block thus read (step S116). Then, of data stored in the area for file data area in the cache memory 80, the data corresponding to the address subjected to the write instruction is rewritten by the data subjected to the write instruction (step S117). Then it goes to the next processing, step S123.

If the area for file data area in the cache memory 80 is not empty (step S115: No), it is judged whether the block number calculated from the address subjected to the write instruction coincides with block number stored in the block number storing part 90 (step S118). If coincides with it (step S118: Yes), the processing of step S117 is executed. Also, if does not coincide with it (step S118: No), the delete control means 50 is controlled to delete data in the nonvolatile memory 70 corresponding to the block number stored in the block number storing part 90 (step S119). Then, data stored in the area for file data area in the cache memory 80 is written in units of block into the area in the nonvolatile memory 70 corresponding to the block number stored in the block number storing part 90 (step S120). Then, a read instruction is issued to the read control means 60, thereby data in the nonvolatile memory 70 corresponding to the block number calculated from the address subjected to the write instruction is read in units of block and copied into the area for file data area in the cache memory 80, thereby the data in the block number storing part 90 is renewed by the block number thus read (step S121). Then, of data stored in the area for file data area in the cache memory 80, the data corresponding to the address subjected to the write instruction is rewritten by the data subjected to the write instruction (step S122). Then it goes to the next processing, step S123.

At step S123, it is judged whether data subjected to the write instruction is still left or not. If data subjected to the write instruction is still left (step S123: Yes), it returns to step S118. On the other hand, if data subjected to the write instruction is not left (step S123: No), the processing operation by the write control means 40 is finished.

Meanwhile, the delete processing by the delete control means 50 at steps S102, S104, S113 and S119 is the same as that explained earlier in FIG. 7. Also, the read processing by the read control means 60 at steps S109, S116 and S122 is the same as that explained earlier in FIG. 8.

For easier understanding of the invention, the detailed example of operation is explained below.

Figure 15:
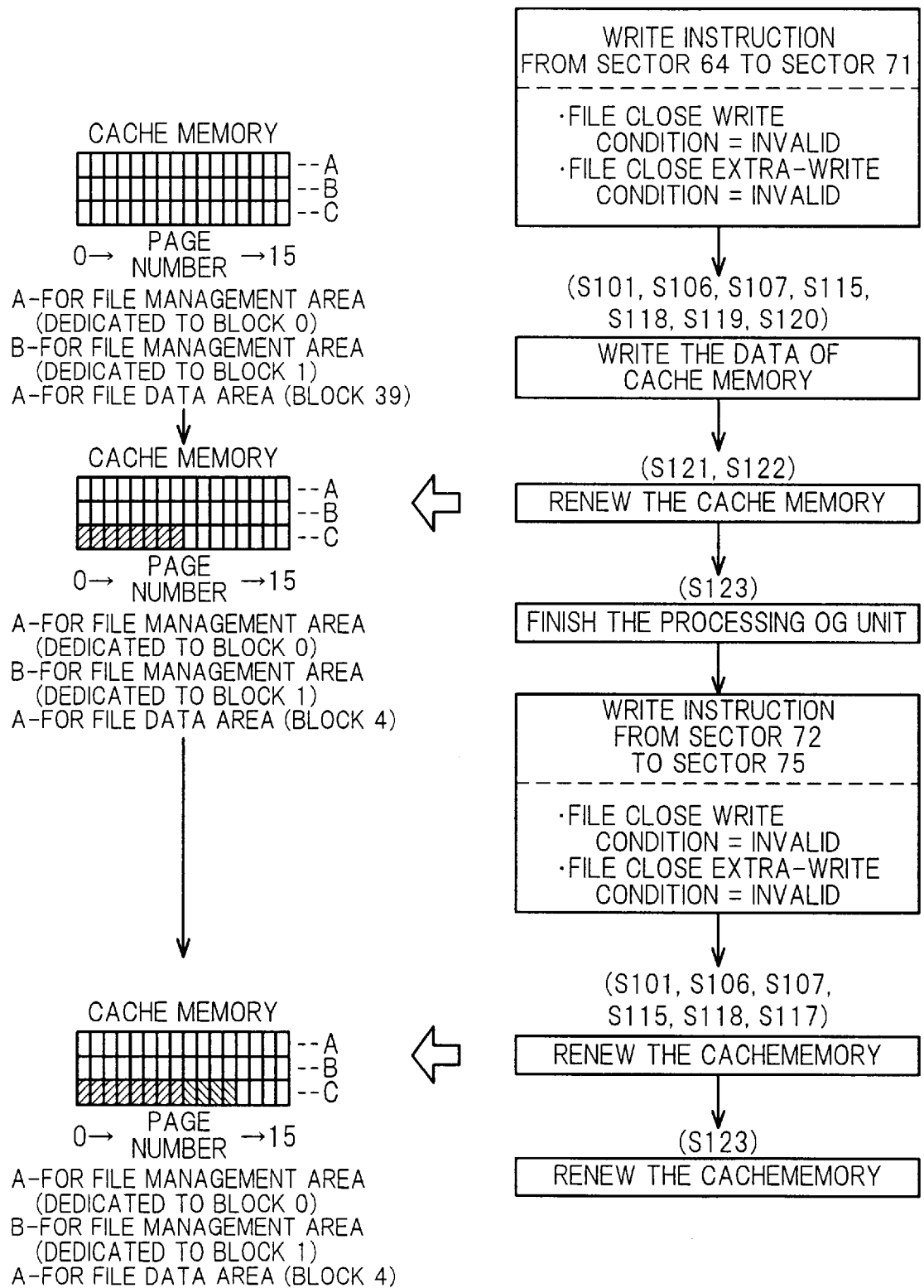
FIG. 15 is a schematic diagram showing the second operation example.

FIG. 15 is an explanatory diagram showing the example of operation of the write control means 40. Now, it is assumed that the write control means 40 receives a write instruction in units of sector. For example, a write instruction to sector 32 means that data of 512 bytes, addresses 0x0000 to 0x1FFF on sector 32 (block 2 and page 0) is subjected to the data write.

Now it is assumed that, in a status that neither "file close write condition" nor "file close extra-write condition" is valid and the area for file data area in the cache memory 80 are storing data to be written into block 39, the write control means 40 receives a write instruction to a file data area (sector 64 to 71).

First, from the sector range subjected to the write instruction, it is judged that the block number is 4 and the write is targeted to file data area. The data of the block number storing part 90 is "39". Thus, since the block number 4 calculated from the address subjected to the write instruction does not coincide with the stored content "39" in the block number storing part 90, the data being stored in the area for file data area in the cache memory 80 is written into the corresponding area to block number 39 in the nonvolatile memory 70 (steps S101, S106, S107, S115, S118, S119 and S120 in FIG. 14). Then, a read instruction is issued to the read control means 60, thereby the corresponding data to block number 4 in the nonvolatile memory 70 is read and copied into the cache memory 80, thereby, of data stored in the cache memory 80, the corresponding 4 KB data to the sectors 64 to 71 is renewed (steps S121, S122 in FIG. 14). Then, the processing operation of the write control means 40 is finished (step S123 in FIG. 14). As shown in FIG. 15, part of upward-oblique lines indicates the part being subjected to data renewal. Apparent from FIG. 15, in area C (file data area), data of 8 pages from sector 64 to 71 is newly stored.

Then, it is assumed that a write instruction to this file data area (sectors 72 to 75) is received. First, from the sector range subjected to the write instruction, it is judged that the block number is 4 and the write is targeted to file data area. The data of the block number storing part 90 is "4". Therefore, the block number 4 calculated from the address subjected to the write instruction does coincide with the stored content "4" in the block number storing part 90. So, of data stored in the cache memory 80, the corresponding 2 KB data to the sectors 72 to 75 is renewed (steps S101, S106, S107, S115, S118 and S117 in FIG. 14). Then, the processing operation of the write control means 40 is finished (step S123 in FIG. 14). As shown in FIG. 15, part of down-oblique lines indicates the part (of 4 pages) being subjected to data renewal.

Thus, also in this operation example, when the block number to which the write data belongs is different from the block number stored in the block number storing part 90, i.e., when the block numbers do not coincide with each other, the data being stored in the cache memory 80 is stored into the corresponding area in the nonvolatile memory 70. Therefore, the number of access to the nonvolatile memory 70 reduces and as a result the processing overhead can be reduced. Also, when the block numbers are identical with each other, the stored content of the cache memory 80 is renewed with the write data. Therefore, the number of access to the nonvolatile memory 70 reduces and as a result the processing overhead can be reduced.

FIG. 16 is a schematic diagram showing the hardware composition of an information processing device in the preferred embodiment according to the invention. This hardware composition is composed of a CPU 100, a ROM 110, a RAM 120 equipped with a cache area and a flash memory 130 as the nonvolatile memory 70. The respective component devices are connected through a bus that allows necessary information to be communicated therebetween. The ROM 110 as a semiconductor recording medium stores a data write control program in which the operation procedures explained above are described. The cache area of the cache memory 80 corresponds to the cache memory 80, and the other area except the cache area stores the file management table 30 and block number storing part 90 in FIG. 1. The CPU 100 runs the data write control program stored in the ROM 110, thereby the information processing means 10, accessing means 20, write control means 40, delete control means 50 and read control means 60 are constructed. Thus, the data write control explained in the flow charts and explanatory diagram above can be conducted.

Although in the hardware composition in FIG. 16 the ROM 110 is used as a recording medium, other recording medium readable by computer may be used. For example, semiconductor recording media such as IC card etc., optical recording media such as CDROM, DVDROM etc., magneto-optic recording media such as MO etc., and magnetic recording media such as FD, hard disk etc. can be used.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A method for writing data into a nonvolatile memory that allows data deletion in block units, comprising the steps of:

storing identification information of a block to which data stored in a cache memory having an access speed faster than said nonvolatile memory belongs;

when writing data into said nonvolatile memory, determining whether the data stored in said cache memory is to be transferred to a corresponding area in said nonvolatile memory based on a comparison of an identification information for a block to which the data being written belongs and the stored identification information; and when the identification information of the block to which the data being written belongs is different from the stored identification information, transferring the data stored in said cache memory to the corresponding area in said nonvolatile memory using the result of the comparison of the identification informations as a trigger for the transfer.

2. A method for writing data into a nonvolatile memory, according to claim 1, wherein:

when the identification information of the block to which the write data belongs coincides with the identification information stored previously, the stored content of said cache memory is renewed with the write data.

3. An information processing device capable of issuing a data write instruction, comprising:

a nonvolatile memory in which data are deleted in block units;

a cache memory having an access speed faster than said nonvolatile memory;

an identification information storing means for storing identification information of a block to which data stored in said cache memory belongs; and a write control means for controlling the write operation of data;

wherein said write control means determines identification information of a block to which data subject to a data write instruction belongs when the data write instruction is issued, and determines whether data stored in said cache memory is to be transferred to a corresponding area in said nonvolatile memory based on a comparison of the determined identification information and an identification information for a block of data stored in said identification information storing means, wherein said write control means transfers the data stored in said cache memory to the corresponding area in said nonvolatile memory when the identification information of the block to which the data being written belongs different from the stored identification information, transferring the data stored in said cache memory to the corresponding area in said nonvolatile memory using the result of the comparison of the identification informations as a trigger for the transfer, and renews the stored content of said cache memory with the data subject to the data write instruction and updates the stored content of said identification information storing means with the determined identification information.

4. An information processing device, according to claim 3, further comprising:

a file management table for storing management information about a file existing in said nonvolatile memory;

wherein said write control means refers to the management information stored in said file management table, and, if said write control means judges that a file close instruction to terminate access to a file is issued, said file being currently in a written and opened status, and there is no file opened except the file subject to the file close by the file close instruction, then said write control means transfers the data stored in said cache memory to the corresponding area in said nonvolatile memory.

5. A recording medium readable by a computer for storing a data write control program that executes a data write into a nonvolatile memory capable of deleting a data in units of block, said data write control program comprising the processing steps of:

storing identification information of a block to which data stored in a cache memory having an access speed faster than said nonvolatile memory belongs;

when writing data into said nonvolatile memory, determining whether the data stored in said cache memory is to be transferred to a corresponding area in said nonvolatile memory based on a comparison of an identification information for a block to which the data being written belongs and the stored identification information; and when the identification information of the block to which the data being written belongs is different from the stored identification information, transferring the data stored in said cache memory to the corresponding area in said nonvolatile memory using the result of the comparison of the identification informations as a trigger for the transfer.

* * * * *